Aug. 24, 1954     A. P. PAPANEK ET AL     2,687,249
FAN CLUTCH DRIVE
Filed Dec. 19, 1951     2 Sheets-Sheet 1

*INVENTORS*
ANDREW P. PAPANEK
NEWELL MECARTNEY, JR.
BY
ATTORNEY

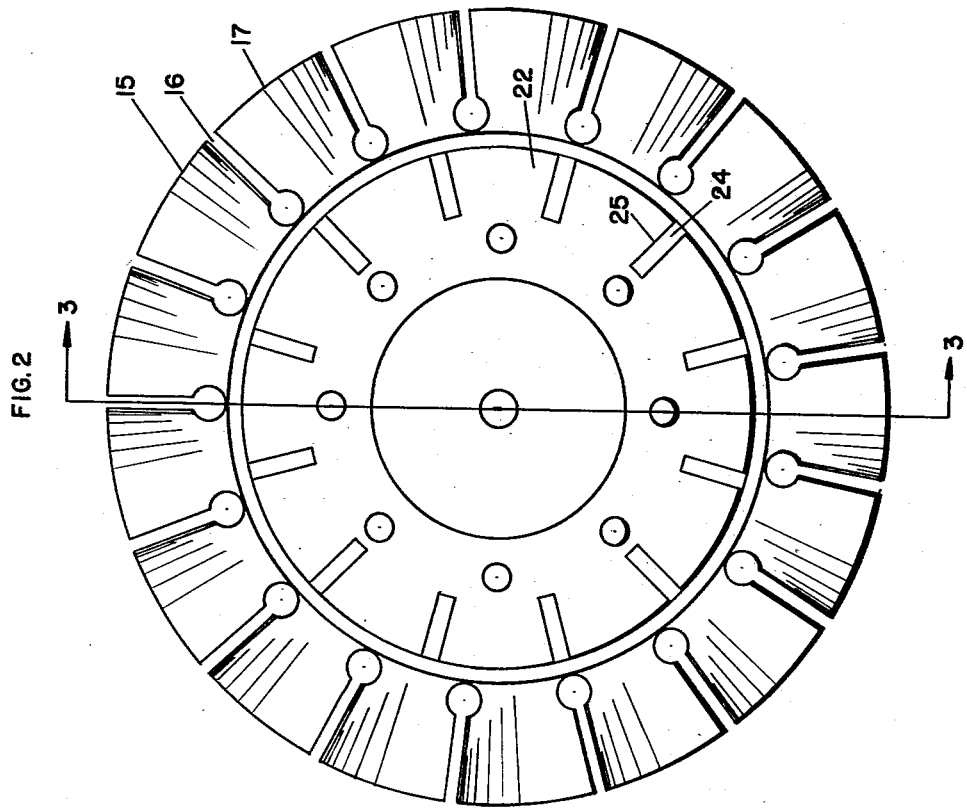
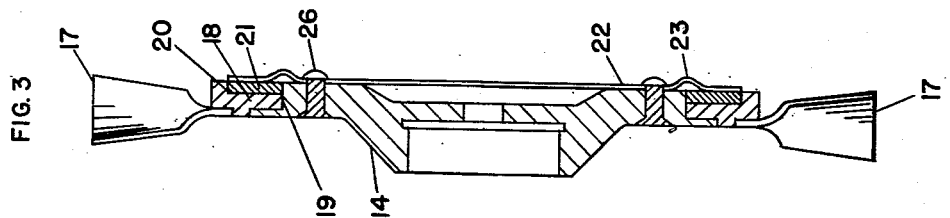

Patented Aug. 24, 1954

2,687,249

UNITED STATES PATENT OFFICE 2,687,249

FAN CLUTCH DRIVE

Andrew P. Papanek, University Heights, and Newell Mecartney, Jr., Garfield Heights, Ohio, assignors to Jack & Heintz, Inc., Cleveland, Ohio, a corporation of Delaware Application December 19, 1951, Serial No. 262,412

1 Claim. (Cl. 230—271)

This invention relates in general to clutch drive mechanisms and more particularly to improvements in friction slip clutches for the driving of a fan by a rotary shaft.

Our invention is primarily motivated by the desire to improve the means for driving the cooling fan of electrical machines, such as generators, which generate so much heat as to require adequate cooling by means of a fan. Usually the cooling medium is atmospheric air that is either drawn in or forced into the generator casing by the fan and circulated through and over the various parts of the generator. There are times, however, when the generator may be partially or wholly submerged in water. When a fan designed for circulation of air is submerged in water, the engagement of the fan with the water will impose a greatly increased resistance to fan rotation and create such an excessive torque as to damage or break the fan, its drive or even the generator shaft.

It is therefore one of the primary objects of the invention to provide a simple and efficient friction slip clutch fan drive that is responsive to infinite variations in torque imposed upon it so as to be engaged and disengaged in response to variations to fan rotation resistance due to the load imposed upon it.

Another object is to provide such a friction disc clutch that is normally resiliently engaged but automatically disengaged upon excessive loads imposed on the fan in the medium in which it is rotating so that it alone will suffice as a means for preventing undue torque loads being imposed upon the fan, the shaft or other moving parts driven by the shaft.

With the foregoing and other objects in view, the invention resides in the combination of parts and in the details of construction hereinafter set forth in the following specification and appended claim, certain embodiments thereof being illustrated in the accompanying drawings, in which:

Figure 2 is a view in end elevation of the fan assembly; and

Figure 3 is a view in section taken through the fan assembly along line 3—3 of Figure 2.

Figure 1:
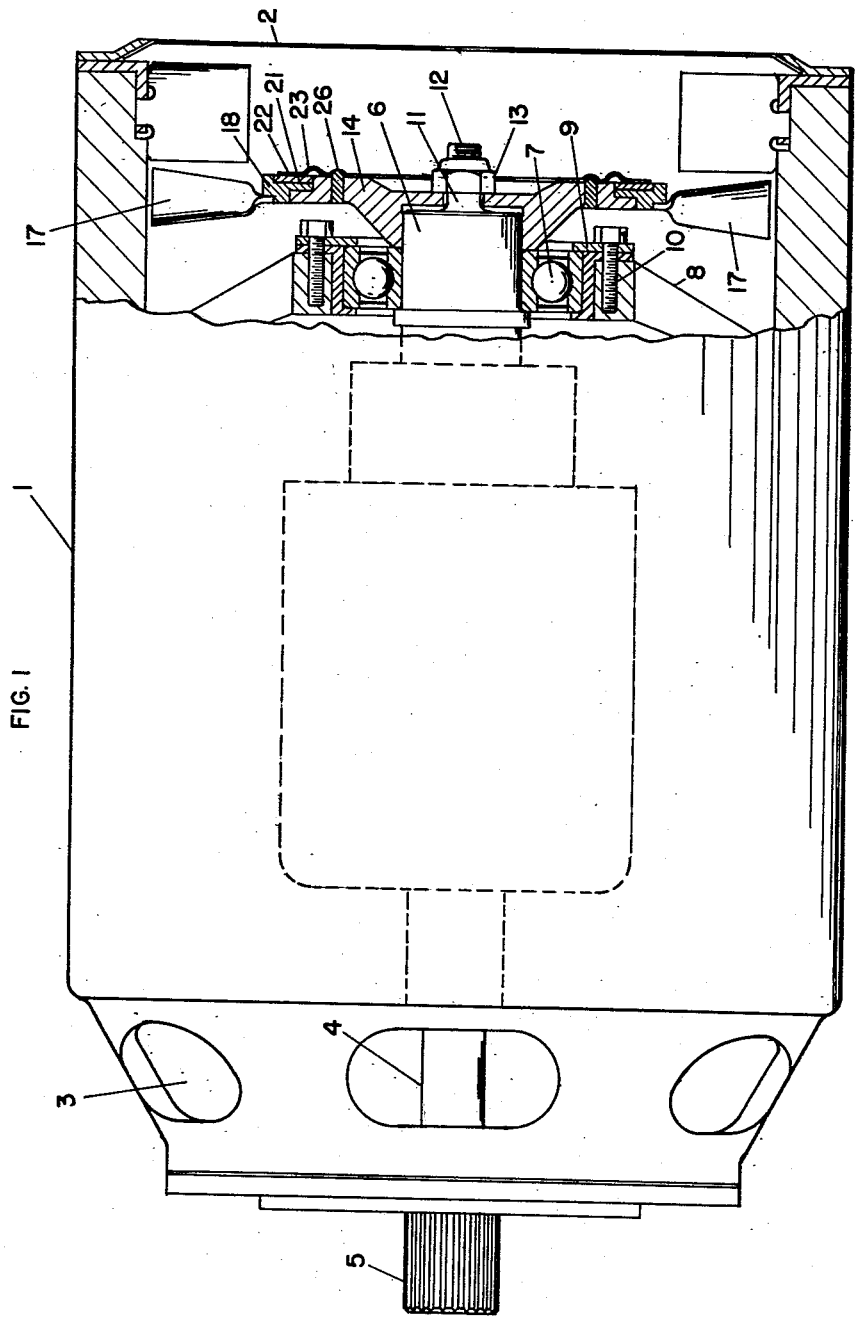
Figure 1 is a view generally in side elevation of a generator embodying our invention, partly broken away to show the fan and fan slip clutch drive between it and the generator shaft.

Referring more particularly to the drawings, we show in Figure 1 a generator having a housing 1 with an open end 2 and outlet ports 3 in the other end for cooling air drawn in by the fan and forced over and through the various generator parts out through outlet ports 3. The generator shaft, generally indicated at 4, is splined at 5 for connection to and to be driven by a suitable prime mover. The other end of the shaft is enlarged at 6 to be rotatable in a bearing 7 supported by stationary housing support 8 and housed by a plate 9 secured by bolts 10 to the support 8.

The reduced end 11 of shaft 6 is screw threaded at 12 to receive a nut 13 to maintain the fan hub 14 keyed on to the shaft 4 so as to be rotatably driven thereby. To form the fan blades we employ a centrally apertured metallic disc, generally indicated in Figure 2 at 15 whose outer rim we slot at seventeen points 16 radially inward, to form seventeen segments 17 that we deform to constitute seventeen fan blades 17 of desired degree and direction of pitch. To this fan blade ring 15 we may permanently secure a centrally apertured rigid backing plate 18. The ring 15 and plate 18, as a unit, are then slidably fitted on the hub so that the inner surface of the plate 18 engages a shoulder 19 on hub 14. The plate 18 is provided with an inner shoulder 20. Slidably fitted on the hub 14, externally of plate 18, is a centrally apertured friction ring 21 that surrounds shoulder 19 of the hub and is inside of shoulder 20 of plate 18.

Externally of the remainder of the fan assembly we provide a spring, generally indicated at 22. This spring is a centrally apertured ring of springy metal axially bowed at 23. Its periphery is slotted radially inwardly at eight points 24 to receive eight lugs 25 on the outer surface of the friction plate 21. On this fan assembly we rigidly secure only the spring 22 to the hub 14 by means of bolts or rivets 26.

The arrangement is such that the drive of the fan by the shaft through the hub is dependent upon the friction between plate 21 and plate 18 and between the hub and plate 18 which is resiliently provided for by spring 22. In normal operation under atmospheric conditions this resilient friction slip clutch drive is sufficient for fan operation for generator cooling purposes.

However, should the fan be partially or wholly submerged in water the impact of the fan blades in water imposes a greatly increased load on the fan. In ordinary conventional construction this would result in damage to or breakage of the fan, the generator shaft or other parts of the generator. In our construction this danger is overcome. The shaft, the hub, the spring and plate 21 continue to rotate. However, due to the fact that the friction plate 21 is only resiliently urged axially into surface contact with fan plate 18, slippage occurs when the load imposed on the fan blades overcomes the effect of the resiliently urged friction clutch plate and hence the shaft and hub no longer drive the fan until the load on the fan decreases to such a degree as to be overcome by the effect of the slip clutch. Hence, there is, by reason of this simple and efficient single slip clutch, provided means for avoiding damage to or breakage of the fan assembly upon the occurrence of undue added loads on the fan and there is also provided means whereby the transmission of such loads to the generator shaft or other parts of the generator is avoided.

We claim:

In a rotating electrical machine, a housing, a drive shaft mounted for rotation in said housing, a self-contained unitary cooling fan assembly and a drive therefor consisting of a hub mounted on said shaft to be rotatably driven thereby, a single element circular fan blade ring loosely mounted on said hub and radially inwardly slotted to form a plurality of fan blades, a single friction disc loosely mounted to circumferentially surround said hub externally of said single element fan blade ring, a leaf spring fixedly secured to the external face of said hub to directly contact said friction disc and adapted to continuously resiliently force said friction disc axially inwardly into frictional engagement with said fan blade ring, regardless of the speed of rotation of said shaft, to constitute a continuously operating torque limiting device and a continuously operating slip clutch drive between said shaft and said fan, regardless of the speed of rotation of said shaft.

References Cited in the file of this patent

UNITED STATES PATENTS

| Number | Name | Date |
| --- | --- | --- |
| 1,411,126 | Page | Mar. 28, 1922 |
| 1,827,039 | Ragan | Oct. 13, 1931 |
| 2,156,047 | Arnold et al. | Apr. 25, 1939 |